May 22, 1934.  A. KÉGRESSE  1,959,477
TREAD TRAIN FOR AN ENDLESS BAND VEHICLE
Filed July 21, 1932
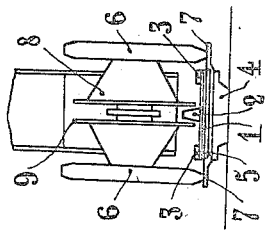
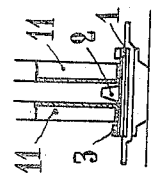
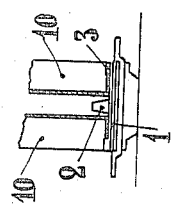
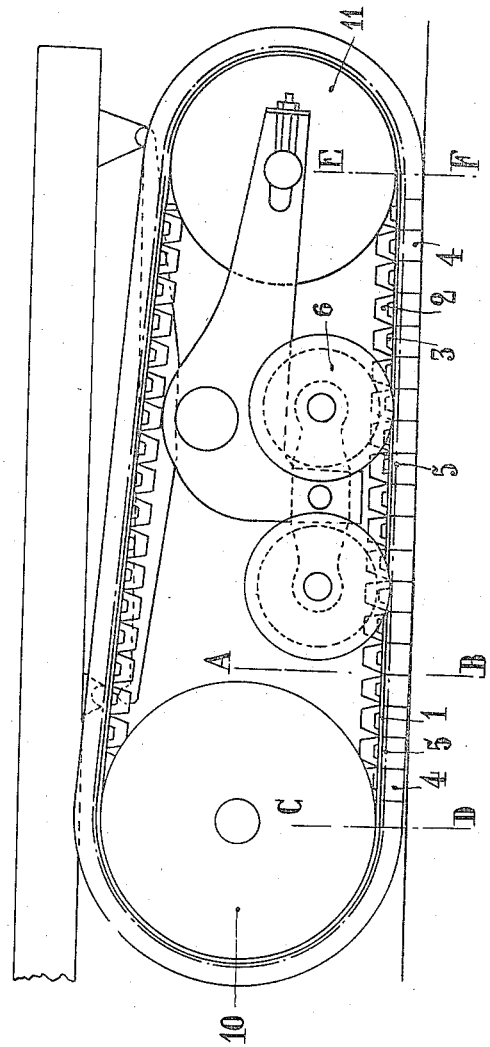
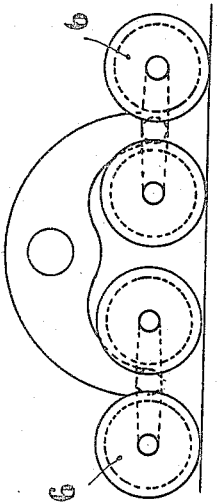
INVENTOR:
Adolphe Kégresse
BY
ATTORNEY Patented May 22, 1934

1,959,477

UNITED STATES PATENT OFFICE 1,959,477

TREAD TRAIN FOR AN ENDLESS BAND VEHICLE

Adolphe Kégresse, Courbevoie, France

Application July 21, 1932, Serial No. 623,851
In France July 24, 1931

2 Claims. (Cl. 305—9)

This invention relates to an endless track mechanism for vehicles.

In the automotive carrier devices known in the prior art, fitted with a single endless flexible band, the load-supporting rollers generally run on the endless band itself, which arrangement involves serious drawbacks.

The object of this invention is to provide an endless track construction for automotive vehicles, in which the set of load-carrying rollers is mounted outside the endless band and runs directly on the metal plates which constitute the exterior bracing or armour of the endless band.

In order to make my invention more clearly understood, I have illustrated by way of example an embodiment of an endless track device constructed in accordance therewith in the accompanying drawing in which:

Figure 1 is an elevational view of an endless track device constructed according to the present invention, Figure 2 is a sectional view through line A—B of Figure 1, showing the arrangement of the load-carrying rollers, Figure 3 is a sectional view through line C—D of Figure 1, showing the manner in which the endless band is mounted on the driving wheel, Figure 4 is a sectional view through line E—F of Figure 1, showing the mounting of the endless band on the idle wheel, and Figure 5 is a diagrammatical elevation of a four-roller train.

In Figures 1, 2, 3 and 4, 1 denotes the endless band, 2 the guide lugs thereof, 3 its driving dogs, 4 its ground tread blocks and 5 the metal platelets constituting the outer armour of the band.

All those parts are mounted as already disclosed by the French Patent No. 640,138 of February 9, 1927 and by the second addition thereto No. 34,697 of December 8, 1927.

As will be readily realized from an examination of Figures 1 and 5, the elevational view is reminiscent of an arrangement already known.

From Figure 2, however, it will be apparent that the rollers 6 are arranged outside the endless band 1, and run directly on the laterally projecting portions 7 of the metal platelets.

The guiding of the set of load-carrying rollers is ensured by suitably shaped drums 8 (Figure 2) secured to the rollers 6. Said drums 8 each carry a flange 9 which, under side stresses, bears against the guide lugs 2 (Figure 2).

The driving of the endless band and the guiding thereof on the end wheels are effectuated in the manner already disclosed. The tread of the endless band on the load-carrying pulleys is different from the tread on the rollers.

As will be seen from Figure 3, the endless band 1 winds round the driving wheel 10 (Figure 1), as already disclosed, and the driving dogs 3 enter openings provided for the purpose, also as already disclosed.

The idle wheel 11 supports the endless band 1 between the driving dogs 3. Like the driving wheel it allows the guide lugs between 2 to pass its spaced rims.

The advantage of the foregoing arrangements is obvious.

The metal platelets are set touching one another, as in the construction shown in the above mentioned patents, thus constituting lengthwise the endless band and on each side thereof an ideal continuous tread for the load-carrying rollers to run on.

Said platelets carry outwardly, as in the arrangements already disclosed by the patents hereinbefore mentioned, ground tread blocks 5.

I claim:

1. An endless track device comprising a pair of longitudinally spaced wheels, one being a driving wheel, pairs of intermediate load-supporting rollers, an endless track belt trained around said wheels and rollers, said endless track comprising an endless flexible band, metal plates secured to, extending transversely of, and projecting laterally beyond, the side edges of the band, tread blocks on the outer faces of the plates, transversely spaced teeth and transversely intermediate guide lugs on the inner face of said band, each end wheel comprising a pair of axially spaced rims between which the guide lugs pass, the rims of the driving wheel having openings to receive said teeth, the rollers of each pair of load-supporting rollers being axially spaced a greater distance than the rims of said longitudinally spaced wheels so that said rollers roll on the inner face of the projecting portions of said plates, while the rims of the wheels roll on the flexible band.

2. An endless track device comprising a pair of longitudinally spaced wheels, one being a driving wheel, pairs of intermediate load-supporting rollers, an endless track belt trained around said wheels and rollers, said endless track comprising an endless flexible band, metal plates secured to, extending transversely of, and projecting laterally beyond, the side edges of the band, tread blocks on the outer faces of the plates, transversely spaced teeth and transversely intermediate guide lugs on the inner face of said band, each end wheel comprising a pair of axially spaced rims between which the guide lugs pass, the rims of the driving wheel having openings to receive said teeth, the rollers of each pair of load-supporting rollers being axially spaced a greater distance than the rims of said longitudinally spaced wheels so that said rollers roll on the inner face of the projecting portions of said plates while the rims of the wheels roll on the flexible band, a drum fixed to each of the load-supporting rollers and projecting axially from one side thereof, the rollers of each pair being positioned in axially spaced relation with the drums intermediate thereof, and each drum having a flange on the free end thereof adapted to cooperate with the guide lugs on the endless band to maintain the band and rollers in operative relation.

ADOLPHE KÉGRESSE.